United States Patent [19]

Dixon et al.

[11] Patent Number: 5,760,951

[45] Date of Patent: *Jun. 2, 1998

[54] APPARATUS AND METHOD FOR SCANNING LASER IMAGING OF MACROSCOPIC SAMPLES

[75] Inventors: Arthur Edward Dixon, 601 Stonebury Crescent, Waterloo, Ontario, Canada, N2K 3R2; Savuas Damaskinos, Kitchener, Canada

[73] Assignee: Arthur Edward Dixon, Waterloo, Canada

[*] Notice: The term of this patent shall not extend beyond the expiration date of Pat. No. 5,381,224.

[21] Appl. No.: 113,191

[22] Filed: Aug. 30, 1993

[30] Foreign Application Priority Data

Sep. 1, 1992 [GB] United Kingdom ............... 9218482

[51] Int. Cl.[6] ............... G02B 21/06; G02B 21/00
[52] U.S. Cl. ............... 359/385; 359/368
[58] Field of Search ............... 359/199, 201, 359/368–390; 356/72, 318, 417, 446; 250/234, 201.3, 216

[56] References Cited

U.S. PATENT DOCUMENTS

| | | | |
|---|---|---|---|
| 4,806,004 | 2/1989 | Wayland | 359/368 |
| 5,225,923 | 7/1993 | Moutagu | 359/199 |
| 5,381,224 | 1/1995 | Dixon et al. | 356/72 |
| 5,386,112 | 1/1995 | Dixon | 250/234 |

FOREIGN PATENT DOCUMENTS 3918412  8/1990  Germany.

OTHER PUBLICATIONS

CJ Miner, "Non–destructive, Whole Wafer ... ", 1992 see p. A10–All for description of apparatus.

G.E. Carver, "Scanned Photoluminescence with High ... ", 1992. See p. A54 for description of apparatus.

Steiner & Thewalt, "Cryogenic, Whole-Wafer Imaging ... ", 1992, see pp. A16–A17 for apparatus.

Dixon, Damaskinos & Atkinson, "A scanning confocal microscope for transmission and reflection imaging", 1991.

H J Hovel, "Scanned Photoluminescence of Semiconductors," 1992 –see p. A2, sect. 3 for equipment.

Moore & Miner, "A Spatially–resolved spectrally–resolved photoluminescence mapping system", 1990 see pp. 22–23.

Booker, Laczik and Kidd, "The Scanning infrared microscope (SIRM) ... ", 1992, see pp. A111–A113 for apparatus.

Primary Examiner—Thong Nguyen
Attorney, Agent, or Firm—Daryl W. Schnurr

[57] ABSTRACT

A confocal scanning beam optical imaging or mapping system for macroscopic samples is disclosed, in which an expanded laser beam passes through a scan system and a telecentric laser scan lens focuses the beam to a moving spot in the sample. Light reflected (or emitted) from the illuminated spot is collected by the laser scan lens, descanned by the scan system, and detected by a confocal detector. Confocal transmitted-light and non-confocal versions are also disclosed. This new scanning beam laser imaging system performs a rapid scan of a large sample with optical image slicing capability (using the confocal detector). Applications include fluorescent imaging of large biomedical specimens, including fluorescent gels, photoluminescence mapping of semiconductor samples, etc.

17 Claims, 13 Drawing Sheets

APPARATUS AND METHOD FOR SCANNING LASER IMAGING OF MACROSCOPIC SAMPLES

TECHNICAL FIELD

This invention relates to the field of Scanning Laser Imaging Systems when used to image macroscopic samples, including systems used to form Photoluminescence (PL) maps of semiconductor samples, or images of semiconductor samples in which the contrast mechanisms include reflected light, transmitted light, scattered light, lifetimes, optical beam induced current or voltage, and others. This invention further relates to fluorescence (FL) images or maps of biological or other samples, as well as reflected light or transmitted light images of these samples. This invention further relates to the area of confocal scanning laser imaging systems, both in reflection and transmission mode, with many contrast mechanisms.

BACKGROUND OF THE INVENTION

When samples are smaller than about 1 mm by 1 mm in size, they are usually imaged by a broad class of instruments called microscopes. This broad class includes scanning laser microscopes, which subclass is further subdivided into scanning stage and scanning beam microscopes. In scanning stage laser microscopes, the sample is moved in a raster scan under a stationary focused laser beam. Such microscopes have good spatial resolution, but are slow. A prior art infinity-corrected scanning beam laser microscope is shown in FIG. 1. In this microscope beam 101 from laser 100 passes through a spatial filter and beam expander, comprised of lens 102, pinhole 104 and lens 106, and two scanning mirrors 110 and 116 deflect the beam in a raster scan. Lenses 112 and 114 bring the beam back to the axis so that it hits the center of scanning mirror 116, and lenses 118 and 120 bring it back to the axis as the beam, now with scan added, enters the entrance pupil of microscope objective 122. The laser beam is focused to a spot on sample 124 by microscope objective 122. Focusing of the microscope is accomplished by moving focusing stage 126. Light reflected back from the sample is collected by the microscope objective, passes back through the scan system, and is partly reflected by beamsplitter 108 into the detection arm, which is comprised of lens 128, pinhole 130 and detector 132. Light returning from the focused spot on the sample is focused by lens 128 to pass through pinhole 130 and reaches detector 132. Light from other points in the sample hits the edges of pinhole 130 and is not detected. When pinhole 130 is used in this way, this is said to be a confocal microscope, and it has optical image slicing ability, which allows it to record true three-dimensional images. In this type of microscope the scanning beam is expanded by the beam expander to fill the entrance pupil of the microscope objective, and passes through the optical axis just as it enters the microscope objective. With a large numerical aperture (NA) 100 X microscope objective, the scan size is about 300 by 300 microns, and with a low power objective, with lower NA, the scan size reaches 1 mm by 1 mm. Confocal scanning beam laser microscopes are also often used for fluorescence and photoluminescence imaging. A transmission and reflection scanning beam confocal microscope was described by Dixon[1] et al and in U.S. Pat. No. 5,386,112. A second design for a transmission microscope is disclosed in DE.A.3918412. In this second design the maximum scan angle is severely limited by the large distance from the last scan lens to the microscope objective, resulting in a scan length that is even smaller than in an ordinary scanning beam microscope.

[1] A. E. Dixon, S. Damaskinos and M. R. Atkinson, "A scanning confocal microscope for transmission and reflection imaging", Nature 351, 551–553, 1991.

There is a broad class of instruments used to form images of macroscopic samples that are larger than the samples usually used in a microscope, that is, larger than about 1 mm×1 mm in size. These instruments use several different contrast mechanisms, including those listed in the "Technical Field" description above. The invention described in this application relates primarily to the imaging of macroscopic samples.

Photoluminescence scanning or mapping of semiconductor wafers is a valuable technique for quality control of wafers and epitaxial layers in the semiconductor industry. One method is to keep the wafer stationary and raster the beam using a gimbaled mirror, as described by Hovel[2]. This has the advantage of being inexpensive, but the laser spot does not stay in focus across the wafer, thus resulting in poor quality images. A second method is to use computer-controlled x-y tables to move the wafer under a stationary focused laser beam, as described by Hovel[2] and by Moore and Miner[3]. This is essentially the use of a non-confocal scanning-stage laser microscope to measure PL across the wafer, and a monochromator is often used to enable PL to be measured as a function of wavelength. This method gives good spatial and spectral resolution, but is slow, since the scan speed is limited by the speed of the moving tables. The combination of a scanning-stage PL mapping system with an apparatus and method for measuring film thickness is described by Miner[4]. A third method of measuring PL maps of large samples is described by Carver[5]. He uses a scanning beam laser microscope to form high resolution images of semiconductor samples, covering an area of 250 microns by 250 microns, and then translates the sample to image other areas. A fourth prior art system is described by Steiner and Thewalt[6]. This system uses a cooled ccd array to image whole wafers, up to 100 mm in diameter, making rapid absorption or photoluminescence maps, and has been used to map EL2 concentration and donor-acceptor pair band photoluminescence intensity in semi-insulating GaAs wafers. Because the ccd array acquires the entire image simultaneously, this system is very fast. Wavelength selectivity is accomplished using interference filters. A complete photoluminescence spectrum of any particular spot on the wafer is acquired with a separate system, using a focused Ar ion laser beam and a remote Fourier transform interferometer. This system has several disadvantages. First, in the whole-wafer imaging mode, it is not possible to acquire complete spectra from each sample position. Second, the intensity of the exciting source at any sample position is severely limited since the whole wafer is illuminated, and the input power required to match the illumination intensity of a laser source illuminating only a single point would cause considerable heating of the wafer. Third, the resolution across the sample is limited to the number of pixels in the ccd camera. Fourth, the sensitivity of detection is limited to the sensitivity of a single detector element in the ccd array.

[2] H. J. Hovel, "Scanned photoluminescence of semiconductors", Semicond. Sci. Technol. 7, A1–A9, 1992.
[3] C. J L. Moore and C. J. Miner, "A Spatially Resolved Spectrally Resolved Photoluminescence Mapping System", J. Crystal Growth 103, 21–27, 1990..
[4] C. J. Miner, "Non-destructive, whole wafer assessment of optoelectronic epitaxial materials", Semicond. Sci. Technol. 7, A10–A15, 1992.
[5] G. E. Carver, "Scanned photoluminescence with high spatial resolution in semi-insulating GaAs and InP: aspects of surface passivation and photodegredation", Semicond. Sci. Technol. 7, A53–A58, 1992.
[6] T. W. Steiner and M. L. W. Thewalt, "Cryogenic, whole wafer imaging of semi-insulating GaAs", Semicond. Sci. Technol. 7, A16–A21, 1992.

An apparatus and method for imaging defects in semiconductor wafers is the scanning infrared microscope (SIRM) described by Booker et al[7]. In this apparatus, a fixed detector placed behind a semiconductor sample detects light transmitted through the wafer from a fixed laser and lens combination. An image of the wafer in transmission is recorded by mechanically raster scanning the sample under the fixed beam. This system gives good resolution, but is slow.

[7] G. R. Booker, Z. Laczik and P. Kidd, "The scanning infrared microscope (SIRM) and its applications to bulk GaAs and Si: a review", Semicond. Sci. Technol. 7, A110–A121, 1992.

The prior art imaging systems described herein and in the reference literature are used generally for reflected light and transmitted light imaging, as well as for PL and FL imaging, but several other contrast mechanisms are possible. These systems have several limitations. The scanning stage systems are slow, because they mechanically scan the sample under a fixed laser beam. Camera-based systems record the image much more rapidly, but the image resolution is limited by the number of detector elements in the ccd array, and it is difficult to get good spectrally-resolved data at each pixel position. Detector sensitivity is limited to the sensitivity of each detector element in the array. In addition, the maximum illumination intensity is limited by heating of the sample.

SUMMARY OF THE INVENTION

It is an object of the present invention to provide a scanning beam imaging system for imaging macroscopic samples in both reflection and transmission. Several different contrast mechanisms may be used, including but not necessarily limited to the following: reflected light, transmitted light, differential phase contrast, photoluminescence, spectrally-resolved photoluminescence, fluorescence, fluorescence decay, spectrally-resolved fluorescence, scattered light, optical beam induced current or voltage, minority carrier lifetime, photoconductivity, scanning reflectance spectroscopy (for example to produce film thickness maps), photoreflectance spectroscopy, and many others.

It is a further object of this invention to provide a confocal scanning beam imaging system for macroscopic samples that will allow optical sections of these samples to be recorded, using several different contrast mechanisms.

It is yet a further object of this invention to provide a confocal or non-confocal scanning beam imaging system for macroscopic samples that will operate in either reflection or transmission mode, thus allowing the sample to be imaged in transmission as well as in reflection from either the top or the bottom, and in which these different images can be selected and displayed or recorded separately.

It is yet a further object of this invention to provide a confocal or non-confocal scanning beam spatially- and spectrally-resolved photoluminescence wafer mapping system that will rapidly image an entire wafer.

It is yet a further object of this invention to provide a confocal or non-confocal scanning beam spatially- and spectrally-resolved fluorescence imaging system for macroscopic biological, medical, zoological, forensic and/or other samples.

A confocal scanning beam optical imaging system for macroscopic specimens has means for supporting a specimen to be observed and measured. An illumination source produces a light beam directed along an optical path toward said specimen. A scan lens focuses the light beam to a diffraction-limited spot in a prescribed specimen plane. There is no image plane between the scan lens and the specimen plane. There are means for scanning the light beam to move the diffraction-limited spot in a predetermined scan pattern on said specimen plane. A first detection arm receives light reflected, scattered or emitted from said diffraction-limited spot in the specimen plane. The first detection arm has a pinhole and a focusing lens for obtaining a focal point for confocal detection of the light returning from the specimen. A first detector is placed behind the pinhole. A first beamsplitter directs light returning from the specimen into the first detection arm. There are means for producing a signal from said first detector.

A confocal scanning beam optical transmission and reflection imaging system for macroscopic specimens has means for supporting a specimen to be observed and measured. An illumination source produces a light beam directed along an optical path toward said specimen. An optical subassembly has a first telecentric scan lens, a second telecentric scan lens, a beamsplitter and a plurality of reflecting means and lenses. The first telecentric scan lens focuses the light beam to a diffraction-limited spot in a prescribed specimen plane. The second telecentric scan lens is placed on the opposite side of said specimen, and coaxial with said first telecentric scan lens, at such a distance that the focal planes of the two telecentric scan lenses coincide. The beamsplitter directs portions of said light beam toward each of the two telecentric scan lenses. The plurality of reflecting means and lenses is arranged such that the two telecentric scan lenses always focus their respective portions of the incoming light to the same spot on said prescribed specimen plane as the scan proceeds. There are means for scanning the light beam to move the diffraction-limited spot in a predetermined scan pattern on said specimen plane. A detection arm receives light reflected, scattered or emitted from said diffraction-limited spot in said specimen plane. The detection arm has a pinhole and a focusing lens for obtaining a focal point for confocal detection of the light returning from the specimen and a detector placed behind said pinhole. A second beamsplitter directs light returning from said specimen into said detection arm. The specimen is illuminated from both sides and the detector receives both reflected and transmitted light resulting from each direction of illumination of said specimen.

A method of constructing a confocal scanning beam optical imaging system for macroscopic specimens, said system having means for supporting a specimen to be observed and measured, an illumination source producing a light beam directed along an optical path toward said specimen, means for scanning the light beam, a detection arm receiving light reflected, scattered or emitted from said specimen, said detection arm comprising a pinhole and a focusing lens for obtaining a focal point for confocal detection of the light returning from said specimen, a detector placed behind said pinhole, a beamsplitter directing light returning from said specimen into said detection arm with means for producing a signal from said detector, said method comprising inserting a scan lens for focusing the light beam to a diffraction-limited spot in a prescribed specimen plane without forming an image plane between said scan lens and said specimen plane and scanning the light beam using the means for scanning to move the diffraction-limited spot in a predetermined scan pattern on said specimen plane.

DESCRIPTION OF THE INVENTION

The present invention is a practical scanning beam confocal or non-confocal imaging system for macroscopic samples that can form images using several different contrast mechanisms, in both reflection and transmission.

A laser beam, expanded to fill the entrance pupil of the laser scan lens passes through a scan system which imposes a scan on the beam, and enters the laser scan lens at its entrance pupil. Because of its long focal length and small NA, a telecentric laser scan lens is used such that the converging cone of rays remains perpendicular to the sample plane even at large scan angles. Light reflected (or emitted) from the sample is collected by the laser scan lens (within the same cone), is descanned by the scan system, and detected by a confocal detector. Even though the laser scan lens has a very small NA and a long focal length, since it is telecentric, the reflection conditions at the surface of a flat sample are unchanged during the scan, even at large scan angles. For a non-telecentric system, light reflected from a flat sample does not travel back along the incoming cone, resulting in a reduction in reflected-light intensity with increasing scan angle, until at large angles, none of the reflected light is collected by the laser scan lens. By contrast with this new telecentric imaging system for large samples, a scanning beam laser microscope, which is not a telecentric system, depends on the large NA and short focal length of a microscope objective, combined with small scan angles, to achieve a constant intensity in reflected light across a flat, uniform sample, thereby severely limiting the field of view.

A confocal transmitted-light version of the new imaging system is also disclosed, in which a second telecentric laser scan lens is used to collect the light transmitted through the sample, which is then re-injected into the optical system above the first laser scan lens, is descanned by the scan system, and detected by the confocal detector. Both of the laser scan lenses are telecentric, so that light passing directly through the sample will be collected by the second laser scan lens, even at large scan angles. In contrast, the prior art transmission microscope described by Dixon[1], et al. and in U.S. patent application Ser. No. 07/995989 is not telecentric, and requires microscope objectives with short focal length and large NA for proper operation, thereby severely limiting the field of view.

Figure 2:
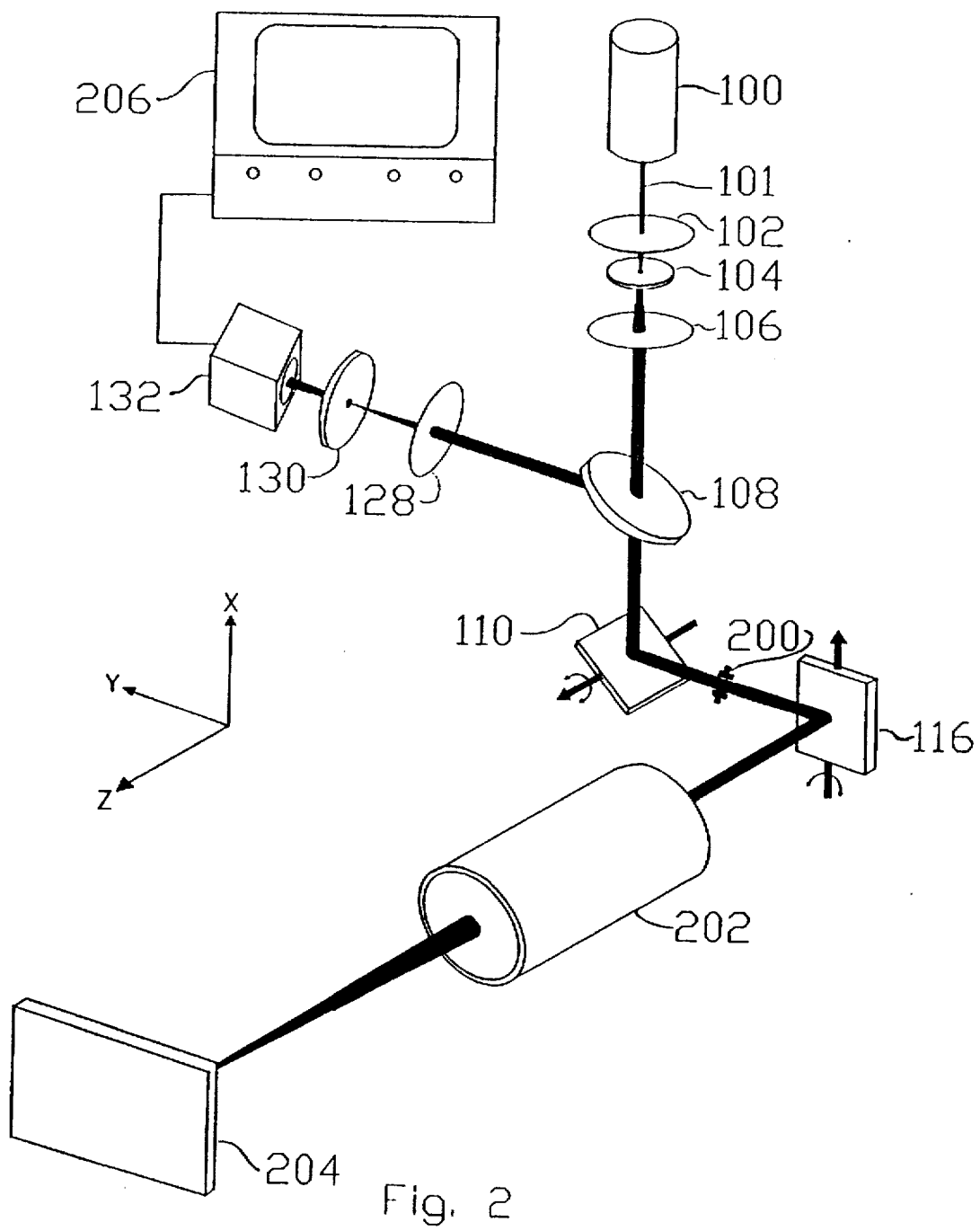
FIG. 2: First embodiment of the present invention: A simple confocal scanning beam laser imaging system for macroscopic samples.

FIG. 2 shows a first embodiment of the invention, a simple confocal scanning laser imaging system that works in reflection. In this embodiment, the incoming laser beam 101 from laser 100 passes through a spatial filter and beam expander (comprised of lens 102, pinhole 104 and lens 106), and is expanded to match the diameter of the entrance pupil 200 of laser scan lens 202. Scanning mirrors 110 and 116 deflect the beam in a raster scan, and rotate about axes that are perpendicular to each other and are placed close together, on either side of the entrance pupil of the laser scan lens. Laser scan lens 202 focuses the beam to a spot on the sample 204, and reflected light is collected by laser scan lens 202, descanned by scanning mirrors 116 and 110, and partially reflected by beamsplitter 108 into a confocal detection arm comprised of lens 128, pinhole 130 and detector 132. Light reflected back from the focused spot on the sample passes through pinhole 130 and is detected, but light from any other point in the sample runs into the edges of the pinhole and is not detected. The scan mirrors are computer-controlled to raster the focused spot across the sample. A computer, represented by a computer screen 206, is connected to the detector 132 to store and display a signal from the detector 132. The computer provides means for displaying the signal from the detector. Laser scan lenses are not usually used in imaging systems, and a beam of light will be collected by the lens that is wider than the incoming laser beam, but only the component of this beam that is parallel to and concentric with the incoming laser beam will pass through the pinhole and be detected. Thus, this is a true confocal imaging system, and will have optical image slicing properties similar to those of a confocal scanning laser microscope, except applied to much larger samples. Note 1: A stop with the same diameter as entrance pupil 200 of laser scan lens 202 can be placed at the entrance pupil position (just to the left of scanning mirror 116 in the diagram) if required, to reduce the out-of-focus part of the returning beam traveling back toward the confocal detector. Note 2: If pinhole 130 is removed, this becomes a non-confocal imaging system. Note 3: Other detectors, for example PL or FL detection systems, including spectrally-resolved systems, can be used. Note 4: If scanning mirror 116 is a partially-reflecting mirror, a detector placed behind the mirror can be used to detect reflected light, FL, PL, etc., but this detector will not be confocal. Note 5: This embodiment allows very large scan angles to be used, since the scan angle is not limited by the diameter and focal length of a lens in the scan system. Note 6: Because the scan does not originate exactly at the entrance pupil position of the laser scan lens, the scan on the sample will be slightly nonlinear in this embodiment.

Figure 3:
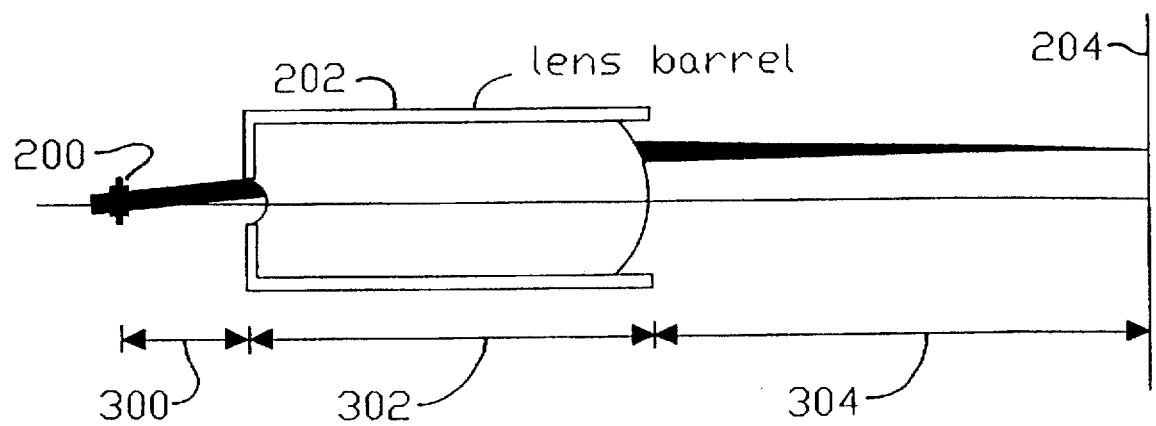
FIG. 3: Outline drawing of a telecentric laser scan lens designed for this application.

A Laser Scan Lens of the type that might be used in such an imaging system is shown in FIG. 3. In other diagrams in this invention disclosure, such a laser scan lens is indicated by a drawing of a simple lens (or as a tube-shaped object), but it is described as a laser scan lens in the text. These lenses are physically very large. The lens used to prototype this invention has a body length 302 of 295 mm, a front working distance 300 of 35.7 mm, and a back working distance 304 of 233 mm, with an effective focal length of 223 mm. The maximum scan angle is +/−10 degrees, resulting in a scan length of 7.5 cm. on the sample. Note that entrance pupil 200 is a considerable distance in front of the lens itself. In some applications, a stop may be placed at the entrance pupil position. The lens shown in this figure is telecentric, which is necessary in transmission applications, but non-telecentric lenses may be acceptable in reflection applications, especially near the center of their scan. A flat focal plane is desirable in reflection applications, and necessary in transmission applications.

Figure 1:
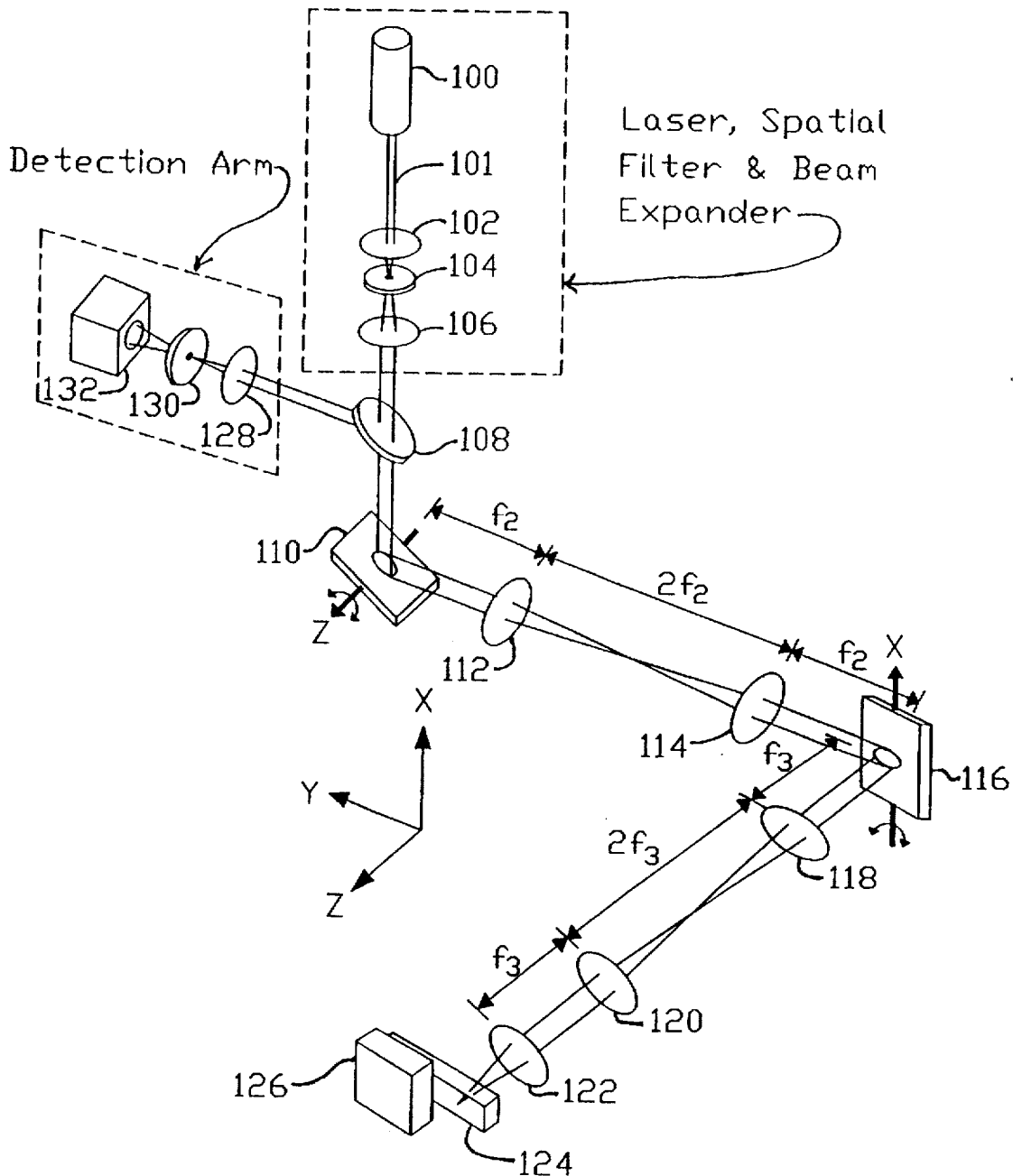
FIG. 1: Prior Art infinity-corrected confocal scanning beam laser microscope.
Figure 4:
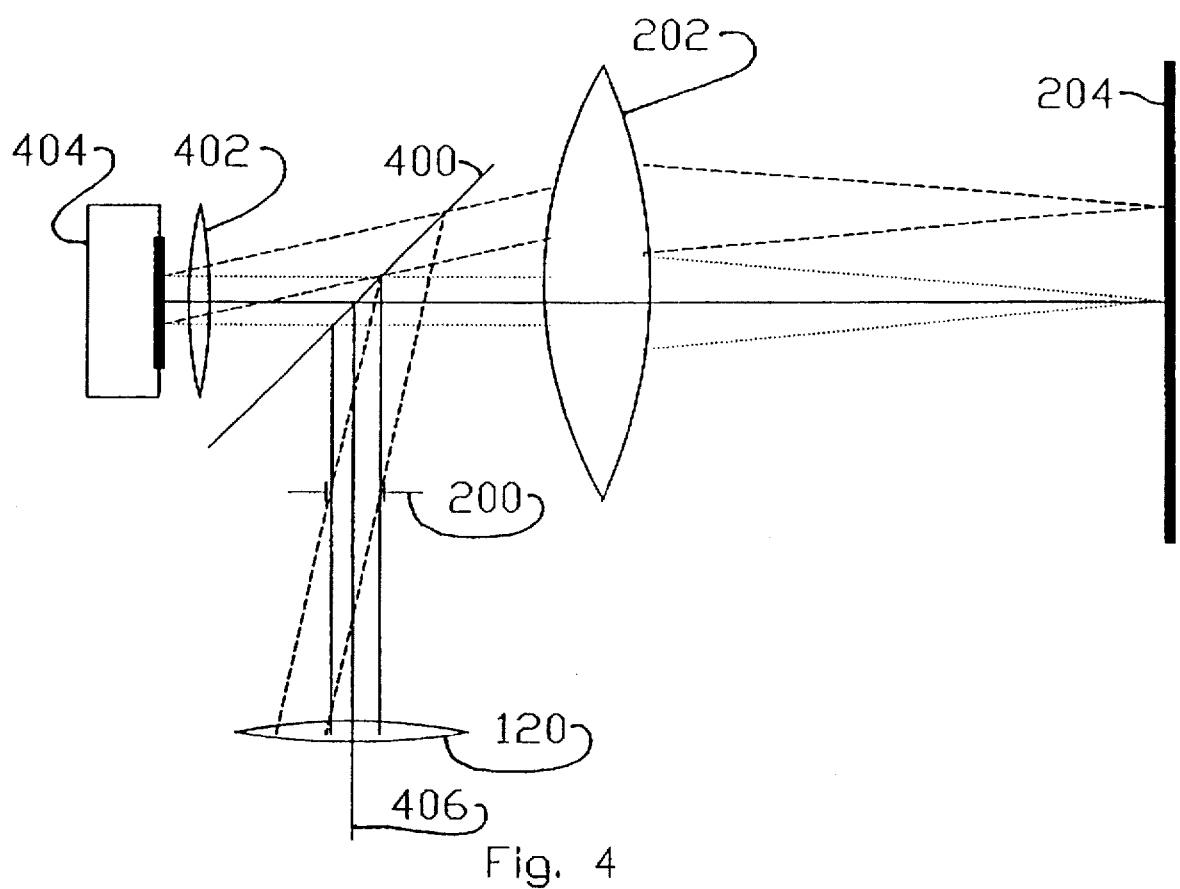
FIG. 4: Second embodiment of the present invention: A non-confocal scanning beam laser imaging system. The laser source, beam expander and scan system are not shown.

A second embodiment of the present invention is shown in FIG. 4. This embodiment uses a laser scanning system like that used in the scanning laser microscope of FIG. 1. Lens 120 of FIG. 4 is the same as lens 120 of FIG. 1; it is the last lens of the scan system. The expanded scanning beam passes through the entrance pupil 200 of laser scan lens 202, and is then reflected by beamsplitter 400 into laser scan lens 202, which focuses the beam to a spot on sample 204, and light reflected back from that spot is collected by the laser scan lens and approaches beamsplitter 400 as a broad beam which passes through the beamsplitter and is collected by condenser lens 402 and impinges on detector 404. Condenser lens 402 and detector 404 comprise a non-confocal detection arm. The returning beam is larger in diameter than the incoming laser beam, but all of the returning light originates at the focused spot on sample 204, so the size of that spot controls the resolution of the imaging system. Because a wider cone of rays is collected than is focused on the sample, the effective Numerical Aperture (NA) of the laser scan lens is larger in collection than in the incoming (illumination) direction. This is a particularly useful embodiment for reflected-light, FL and PL imaging of large samples, like semiconductor wafers or fluorescent gels. Detector 404 can also be replaced by a spectrally-resolved detector. This embodiment can also be used for other non-confocal applications, for example Optical Beam Induced Current (OBIC) imaging.

Figure 5A:
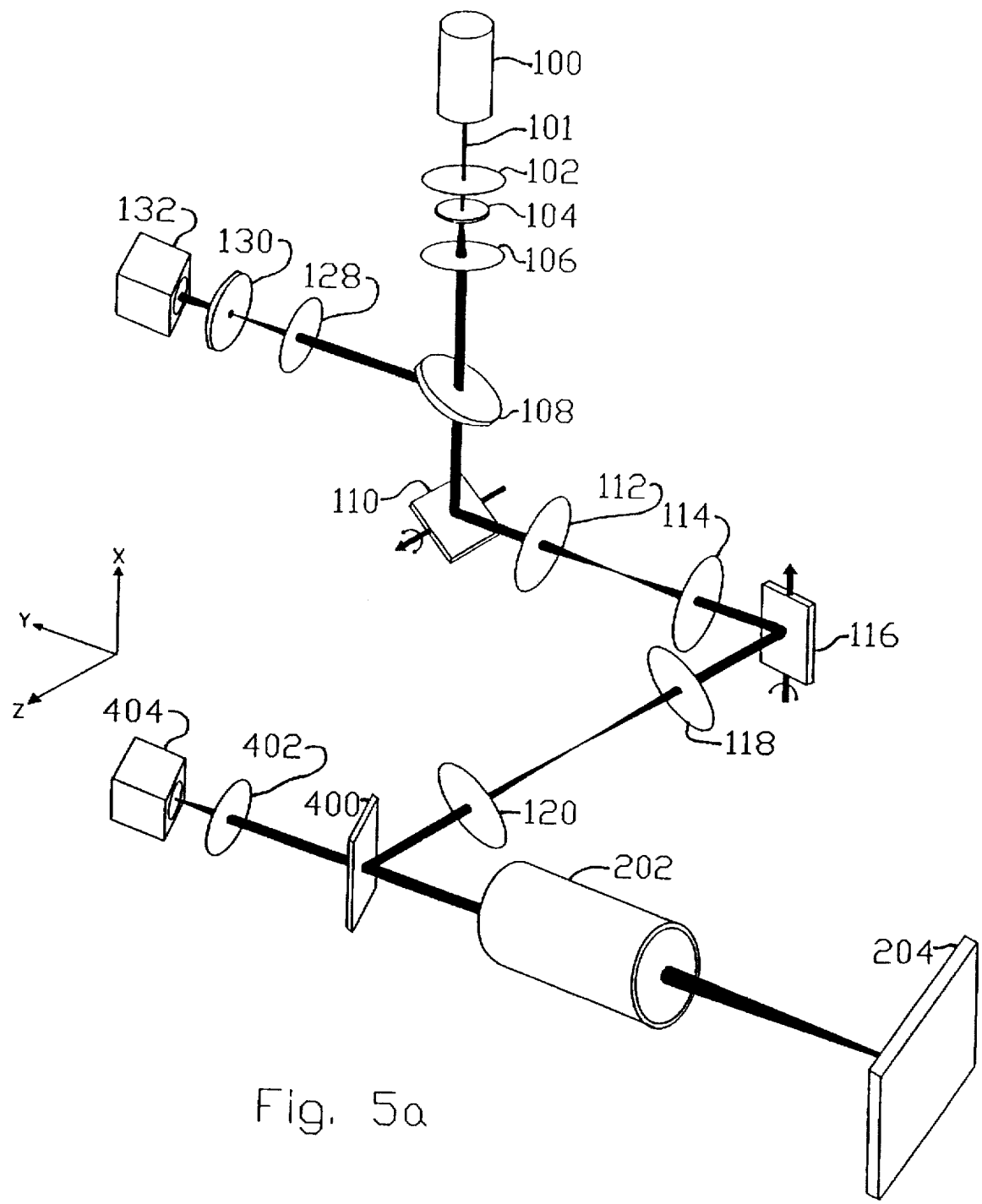
FIG. 5a: Third embodiment of the present invention: A confocal scanning beam laser imaging system shown with optional non-confocal detector 404.
Figure 5B:
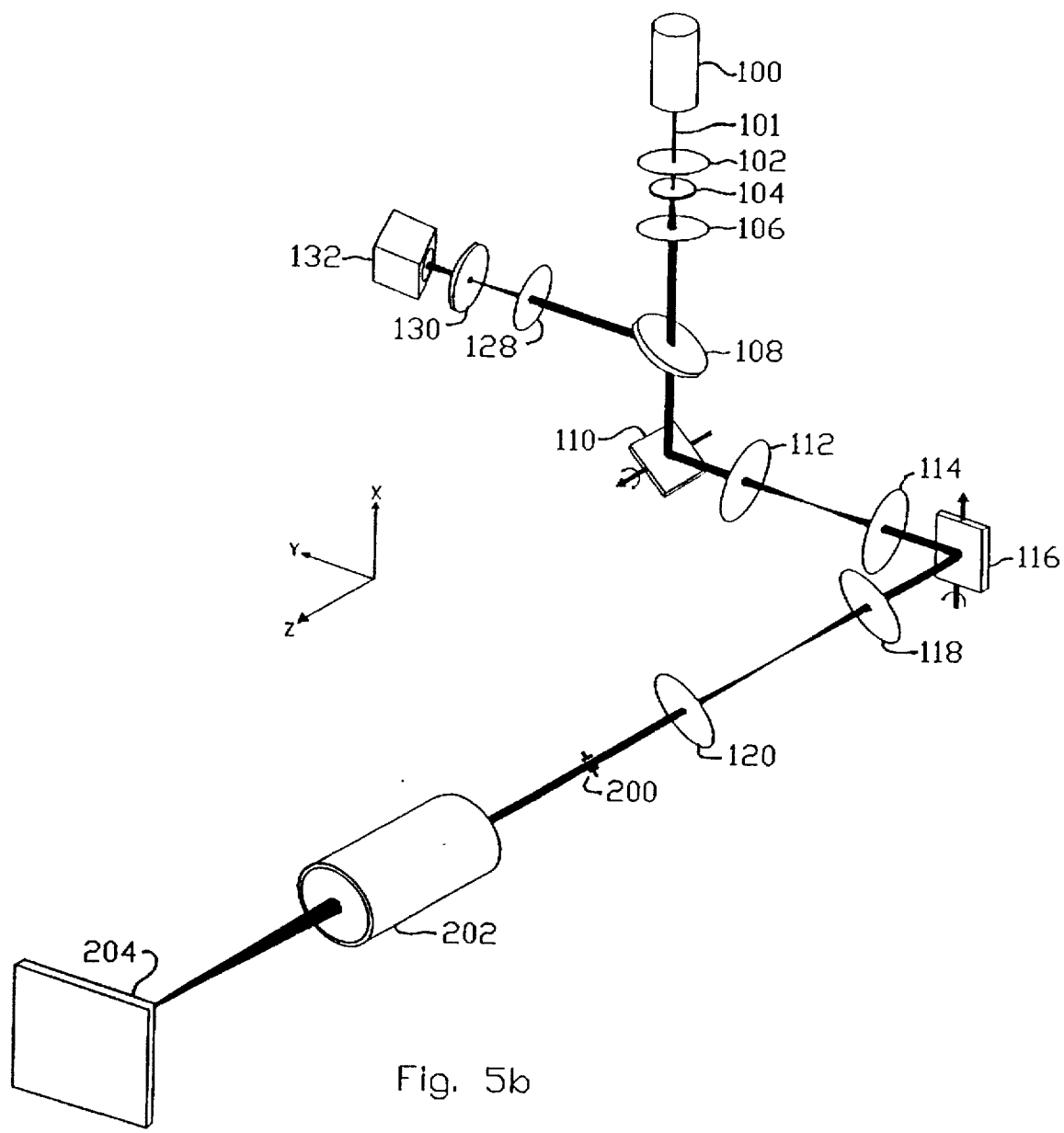
FIG. 5b: The confocal scanning beam laser imaging system of FIG. 5a without a non-confocal detector.

A third embodiment of the imaging system which includes confocal detection is shown in FIG. 5a. In this embodiment, the incoming laser beam 101 is expanded by the spatial filter and beam expander (comprised of lens 102, pinhole 104 and lens 106) to fill the entrance pupil of laser scan lens 202. The scan system is similar to that used in the microscope shown in FIG. 1. After passing through the last lens of the scan system (lens 120) the expanded beam is reflected by beamsplitter 400 into laser scan lens 202 and is focused on sample 204. In this configuration, beamsplitter 400 is centered at the entrance pupil of laser scan lens 202, which is also the focal point of lens 120. Light reflected from the illuminated spot on sample 204 (or FL or PL from that spot) is collected by laser scan lens 202 and passes back through the scan system to be partially reflected by beamsplitter 108 into the confocal detection arm comprised of lens 128, pinhole 130 and detector 132. Part of the light returning from the illuminated spot on sample 204 passes through beamsplitter 400 and is collected by detector 404 (with condenser lens 402 if necessary), and this light can be used to form a non-confocal image. Note: If only a confocal image is required, then beamsplitter 400 can be removed and laser scan lens 202 can be placed on the same axis as lens 120, with the entrance pupil 200 of laser scan lens 202 centered at the focal point of lens 120, as shown in FIG. 5b. A stop with the same diameter as the entrance pupil can be placed at that position if necessary to reduce the stray light that will be collected by the laser scan lens.

Figure 6:
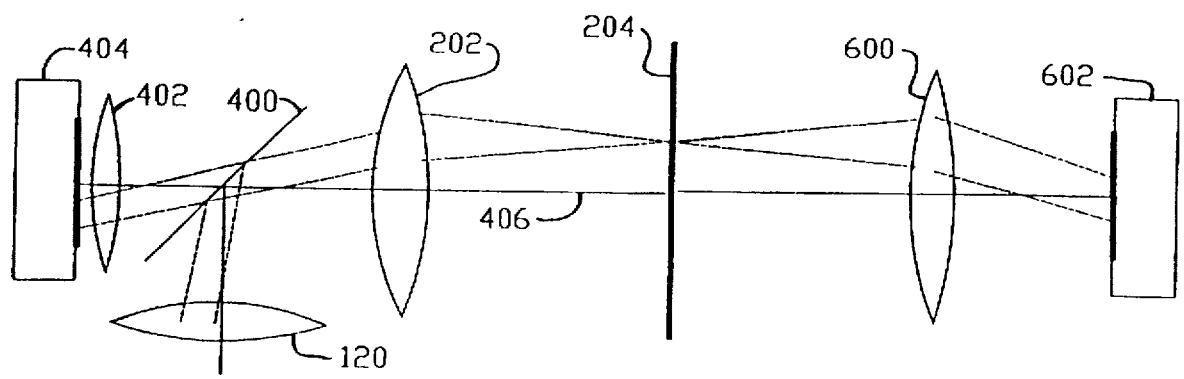
FIG. 6: Fourth embodiment of the present invention: A non-confocal scanning beam laser imaging system with both reflection and transmission detectors. Laser source, spatial filter and beam expander, detection arm and scan system are not shown.

A fourth embodiment of the invention that provides both transmission and reflection imaging is shown in FIG. 6. A scan system like that shown in FIG. 5 can be used. In this embodiment, detector 404 is a non-confocal reflection detector, as before, but here light passing through sample 204 is collected by condenser lens 600 to illuminate transmission detector 602, which now provides a non-confocal transmission image as the beam scans across the sample. An FL or PL detection system can be used in place of detector 404 and/or detector 602 to collect FL or PL images, and the NA of this system in collection is larger than the NA of laser scan lens 202 when it is used in the illumination direction. Note: condenser lens 600 and transmission detector 602 can be added to any of the embodiments already described in FIGS. 2,4 or 5.

Figure 7A:
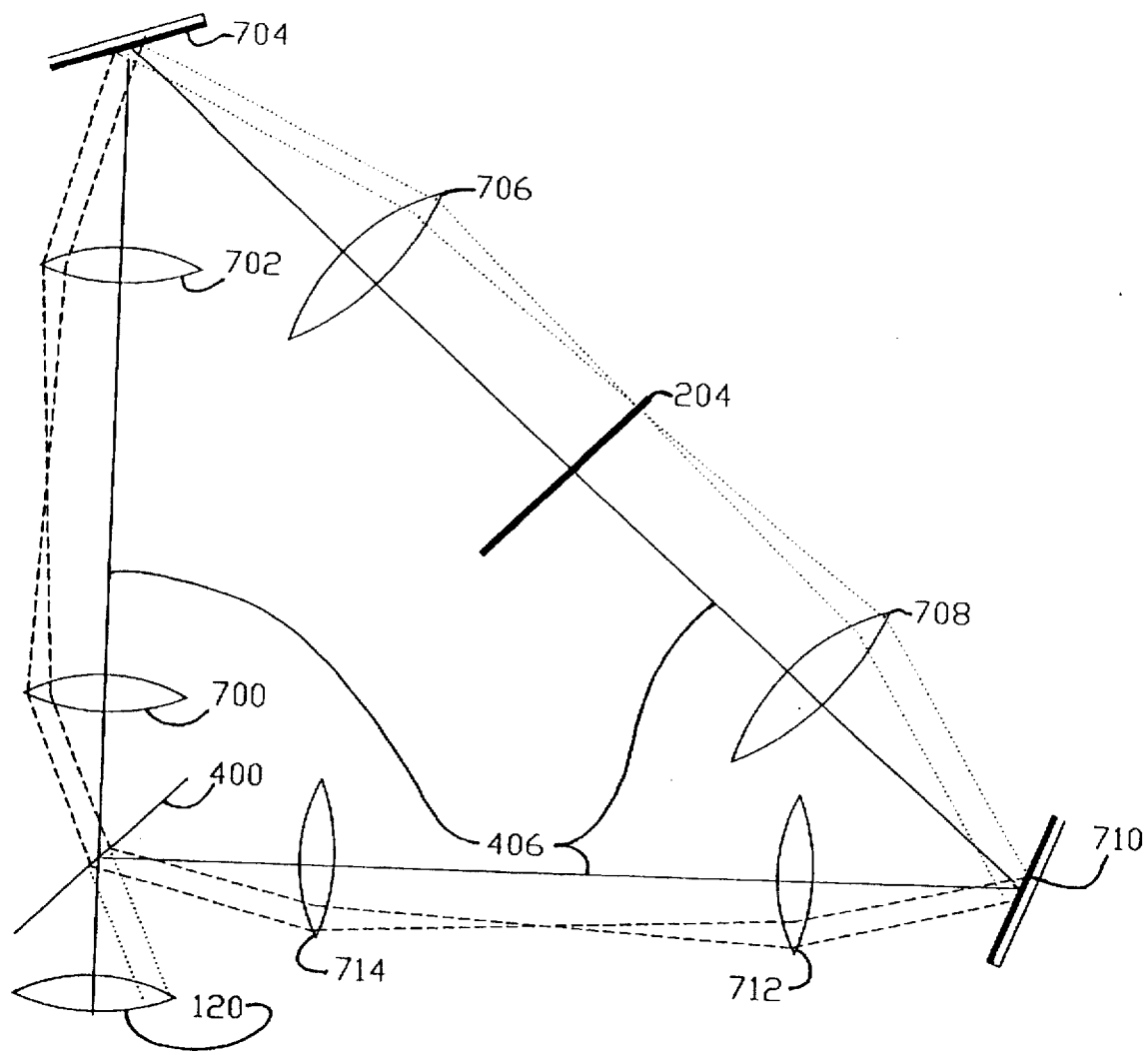
FIG. 7a: Fifth embodiment of the present invention: A confocal scanning beam laser imaging system for transmission and reflection imaging. Laser source, spatial filter and beam expander, and scan system are not shown.

A fifth embodiment of the present invention that provides both reflection and transmission confocal imaging is shown in FIG. 7a. As before, lens 120 is the last lens of the scan system used in the microscope shown in FIG. 1. Lenses 700 and 702 are lenses with equal focal length f1, placed a distance 2f1 apart. Lenses 712 and 714 also have focal length f1, and are also placed a distance 2f1 apart. The incoming scanning beam is split by beamsplitter 400 into two parts, so that a first part travels toward lens 700, and a second part toward lens 714. In this diagram, dashed lines represent the beam when it is above the plane of the diagram, and dotted lines are below the plane. The incoming beam passes through the optic axis of the system at the focal point of lens 120, which coincides with the focal points of lenses 700 and 714. Lenses 700 and 702 bring the first part of the incoming beam back to the axis as it enters the entrance pupil of telecentric laser scan lens 706. Mirror 704 is placed to reflect the scanning beam toward telecentric laser scan lens 706, which focuses the scanning beam onto the sample 204, and light reflected from sample 204 is collected by telecentric laser scan lens 706 and passes back through lenses 702 and 700 and the scan system to reach the confocal detector (not shown). At the same time, light transmitted through the sample is collected by telecentric laser scan lens 708, is reflected by mirror 710, passes through lenses 712 and 714 and is reflected by beamsplitter 400 back into the scan system, and thereby returns to the confocal detector. The second part of the incoming beam is reflected by beamsplitter 400 toward lens 714, is brought back to the axis 406 by lens 712 at the entrance pupil of telecentric laser scan lens 708, and is focused to a spot on sample 204. Again, part is reflected and part is transmitted, and both reflected and transmitted beams are descanned on their way back to the detector. Note that mirrors 704 and 710 will normally be placed as close to the scan lenses 706 and 708 as possible, since this reduces the size of the optical system, but that in any case the distance from lens 712 to the front side of scan lens 708 (and from lens 702 to the front side of scan lens 706), when measured along the optic axis, must equal f1 plus the front working distance of the laser scan lens. Also note that in this embodiment, scan lenses 706 and 708 are identical, telecentric lenses with flat focal planes. Also note that the diameters of lenses 700, 702, 712 and 714 are large because of the long focal lengths required. In order to reduce the diameter of the lenses required, four lenses of shorter focal length can be used in each arm instead of using two lenses. This will halve the focal length and diameters of the lenses in each arm.

In many situations it is desirable to be able to separate the four images (reflection from one side of the sample, reflection from the other side of the sample, transmission from one side, and transmission from the other). This can be accomplished by placing a half-wave plate and polarizer in one arm of the subassembly shown in FIG. 7a, for example between lenses 700 and 702, and by adding an analyzer to the detection arm of the imaging system (for example in front of lens 128 in FIG. 5a). (In order to preserve the symmetry of the two equal arms of the triangle on which the optical subassembly shown in FIG. 7a is based, it may be better to place the half-wave plate in one arm and the polarizer in the other, or to use a thin glass plate to ensure that the optical distance is the same in both arms.) The method using these additional components to separate the four images is described in U.S. Pat. No. 5,386,112.

Figure 7B:
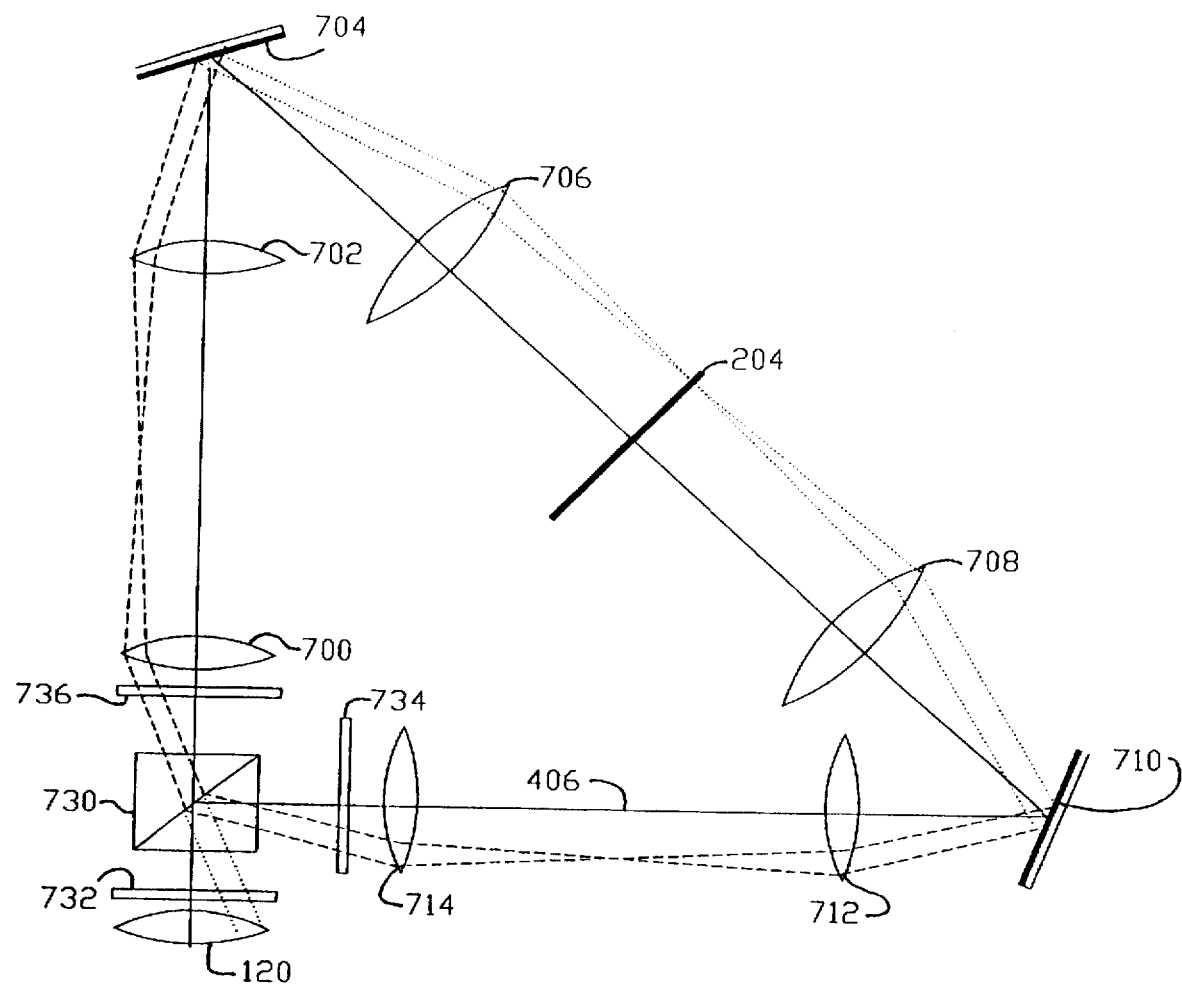
FIG. 7b: The optical subassembly of FIG. 7a with additional components for separating reflection and transmission images from both sides of the sample.

A further technique for separating the reflection and transmission images uses the optical subassembly shown in FIG. 7b. In this embodiment of the invention (embodiment 6A), beamsplitter 400 is replaced by polarizing beamsplitter 730. During setup of the imaging system, the polarization of the incoming laser beam is oriented so that the incoming beam passes through polarizing beamsplitter 730 towards lens 700, and none of the light is reflected towards lens 714. If two quarter-wave plates 734 and 736 are added to the optical subassembly in the positions shown in FIG. 7b, then the incoming laser beam is transmitted around the optical subassembly in a clockwise direction, passing through the sample and both quarter-wave plates to be reflected by polarizing beamsplitter 730 back towards the scan system, is descanned and then partially reflected towards the confocal detector by beamsplitter 108, and thus a transmission image is detected in which the sample is illuminated from the side nearest telecentric laser scan lens 706. If half-wave plate 732 is now inserted at the position shown, the incoming laser beam will be reflected by polarizing beamsplitter 730 and will travel around the subassembly in a counter-clockwise direction. It passes through the sample and both quarter-wave plates, is then transmitted by polarizing beamsplitter 730, passes through half-wave plate 732 a second time, and returns through the scan system to the confocal detector. In this way a transmission image of the sample is recorded with illumination from the side nearest telecentric laser scan lens 708. If both quarter-wave plates and the half-wave plate are removed, a reflection image of the sample is recorded, illuminated by telecentric laser scan lens 706. If the half-wave plate is now inserted, a reflection image from the side nearest telecentric laser scan lens 708 is recorded. An analyzer 816 (see FIG. 8) may be placed in front of lens 128 in the confocal detection arm if required to monitor changes in polarization caused by the sample itself, and to provide additional discrimination between the reflected and transmitted images.

Figure 7C:
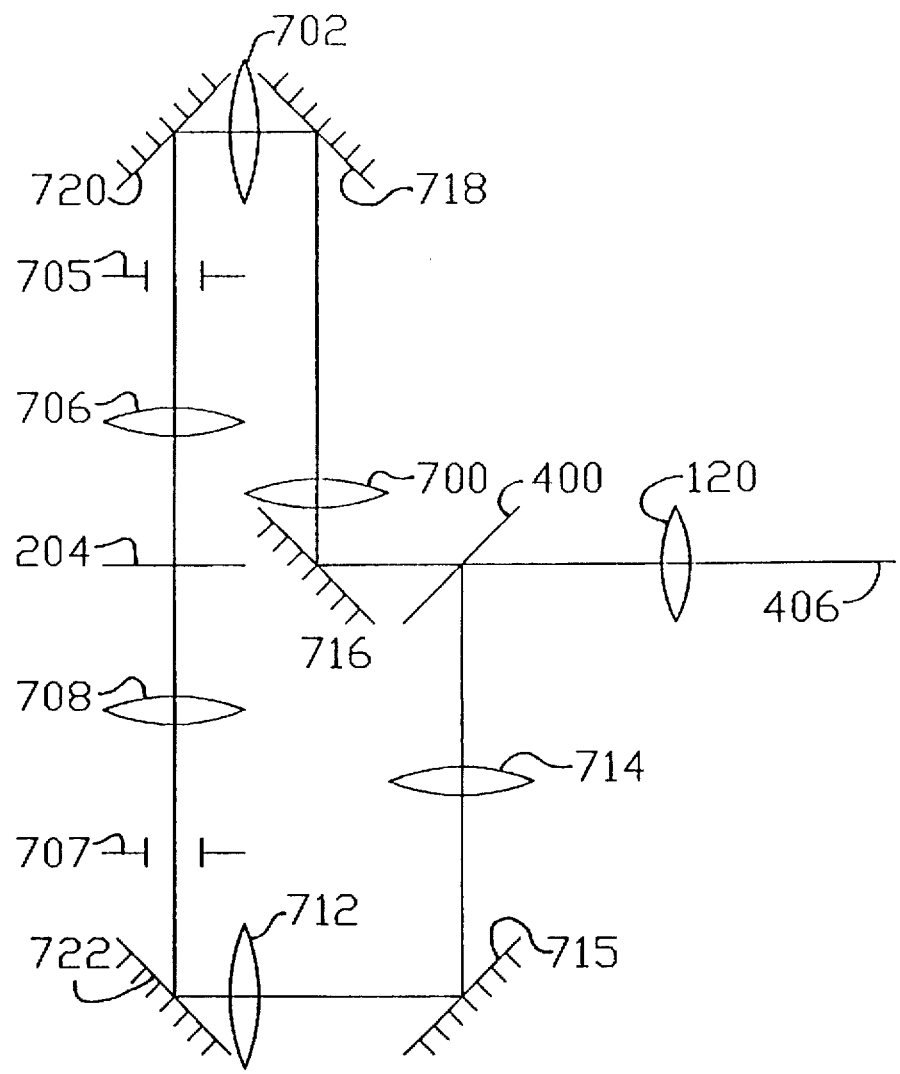
FIG. 7c: The optical subassembly of FIG. 7a folded into a rectangular pattern.
Figure 7D:
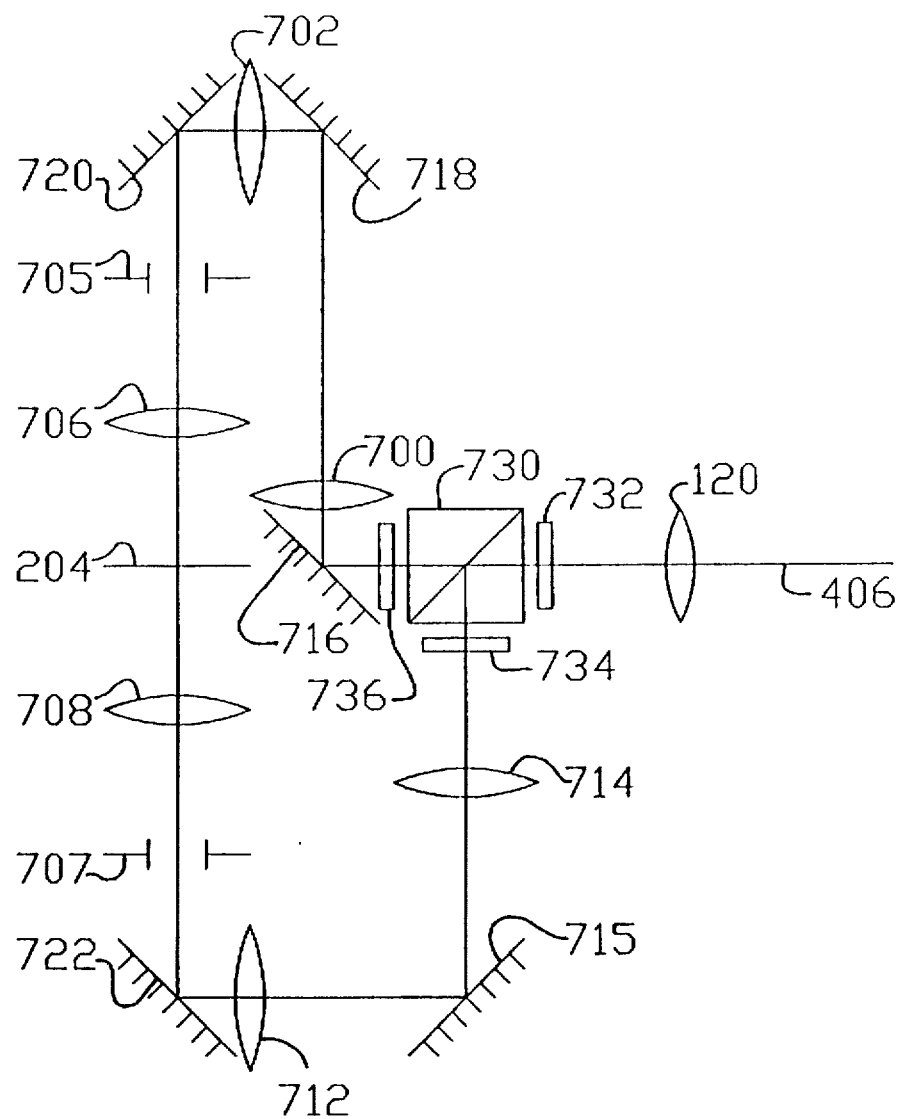
FIG. 7d: The optical subassembly of FIG. 7b folded into a rectangular pattern.

FIG. 7c shows the optical subassembly of FIG. 7a folded into a rectangular pattern, using mirrors 716, 718, 720, 722 and 715. Because of the physical size of components like telecentric laser scan lenses 706 and 708 (with entrance pupils 705 and 707 respectively), and because of the square placement of holes on an optical breadboard, this may be a more convenient layout to build. The same technique can be used to separate the four images as was used with the layout of FIG. 7a. Note that using the rectangular layout, if extra components are placed in one arm, the length of that arm can be adjusted to compensate without changing any of the reflecting angles, a further advantage of this rectangular configuration. FIG. 7d shows the optical subassembly of FIG. 7b, folded into a rectangular pattern. Except for the rectangular placement of components, this subassembly works the same as that shown in FIG. 7b.

Note that in the embodiments shown in FIG. 7, lenses 712 and 702 need not have the same focal length as lenses 714 and 700. The two lenses in each arm must still be placed a distance apart equal to the sum of their focal lengths, however, and the entrance pupils 707 and 705 of telecentric laser scan lenses 708 and 706 must still be placed at the focal points of lenses 712 and 702 respectively. For example, if lens 712 and lens 702 have a shorter focal length than lens 714 and lens 700, then the scan angle at the entrance pupils of telecentric laser scan lenses 708 and 706 is increased, but the beam diameter is decreased.

Figure 8:
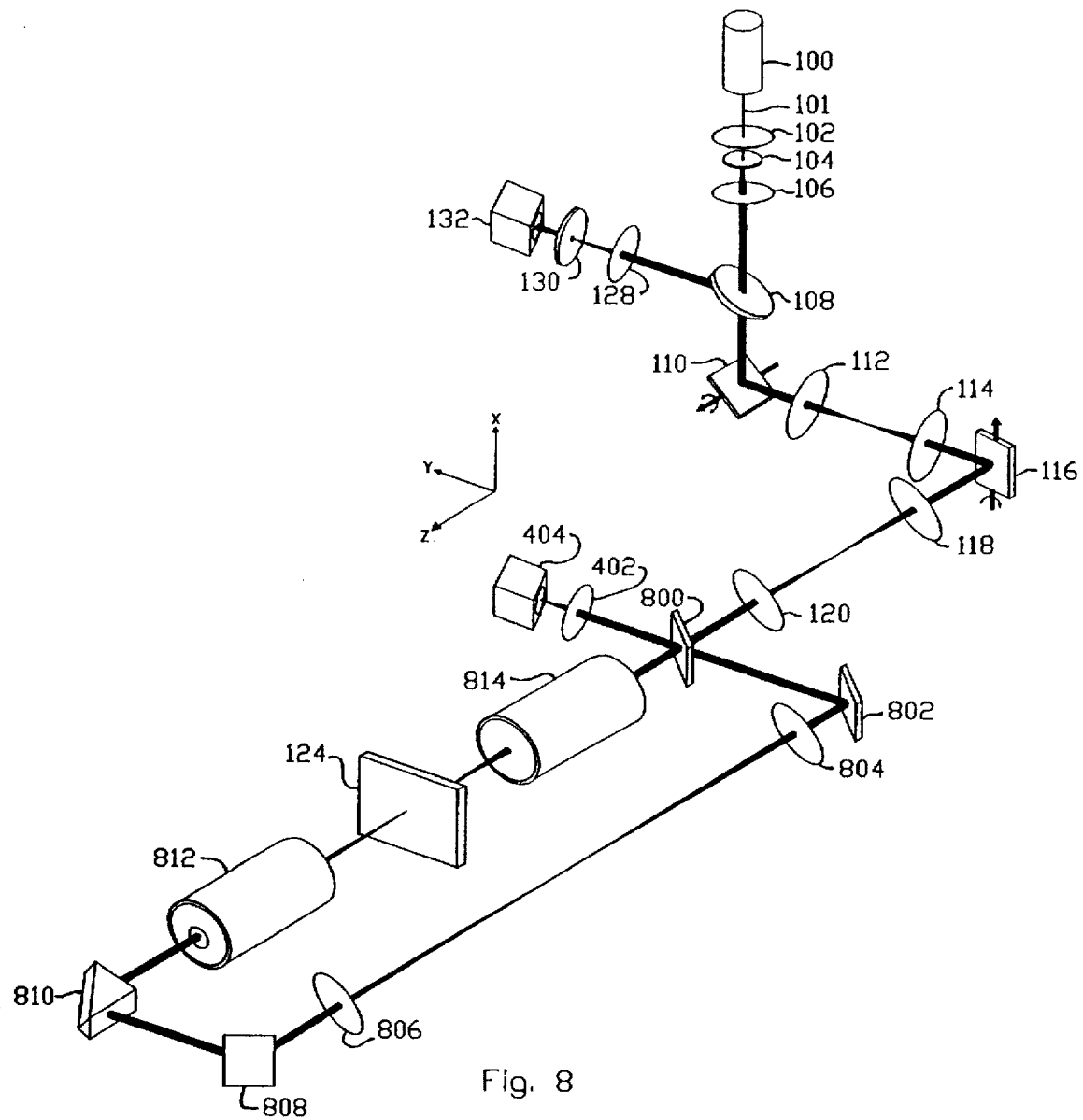
FIG. 8: Sixth embodiment of the present invention: A confocal scanning beam laser imaging system for transmission and reflection imaging using an optical configuration that is different from that used in the fifth embodiment.

A sixth embodiment of the present invention is shown in FIG. 8. This embodiment also enables both confocal reflection and transmission imaging to be performed, and since the distance from lens 120 to the entrance pupil of telecentric laser scan lens 814 is small, a large scan angle can be achieved using lenses in the scan system with short focal length and small diameters. For example, a scan angle of +/−8.5 degrees can be achieved with a scan-system lens 120 of focal length 10 cm. and diameter 5 cm., with a beam diameter of 2 cm. This lens can be readily purchased from standard optics suppliers. This embodiment uses an optical system similar to that used in the prior art scanning laser transmission microscope described in Reference 1 and in U.S. Pat. No. 5,386,112, except that the microscope uses microscope objectives instead of laser scan lenses, and the microscope system is not telecentric. Telecentricity is not as important in the microscope because the objectives used have very large NA, and the scan angles are small. The maximum scan achieved with the microscope is about 1 mm.×1 mm. This embodiment of the present invention uses telecentric laser scan lenses 812 and 814, with flat focal planes, placed coaxially and at a distance apart such that their focal planes, and the focal spots of each lens at any instant, exactly coincide. Roof prism 810 is necessary to provide both reversion and inversion of the beam. Beamsplitter 800 serves the same purpose as beamsplitter 400 in FIG. 7a, and mirrors 802 and 808 are placed as shown. Lenses 804 and 806 have focal length f2, and are placed a distance 2f2 apart, measured along the optic axis. They are also placed so that each is a distance f2 from the entrance pupil of one of the laser scan lenses. Beamsplitter 800 is shown at the position of the entrance pupil of telecentric laser scan lens 814 and reversion prism 810 is shown at the position of the entrance pupil of telecentric laser scan lens 812, but this placement is not critical, as long as the distances from the entrance pupils of the laser scan lenses to lenses 804 and 806, measured along the axis, are correct as stated above. One disadvantage of this embodiment is that lenses 804 and 806 must have a focal length f2 that is set by the physical size of telecentric laser scan lenses 812 and 814 and by the practical limits of arranging the optical components. This means that f2 is large, and thus the diameter of lenses 804 and 806 is also large if large scan angles (+/−10 degrees or more) are required. In a prototype version of the microscope, lenses 804 and 806 have a diameter of nearly 4 inches when used with the laser scan lens shown in FIG. 3. A method of separating the four images is described in U.S. Pat. No. 5,386,112.

Figure 9:
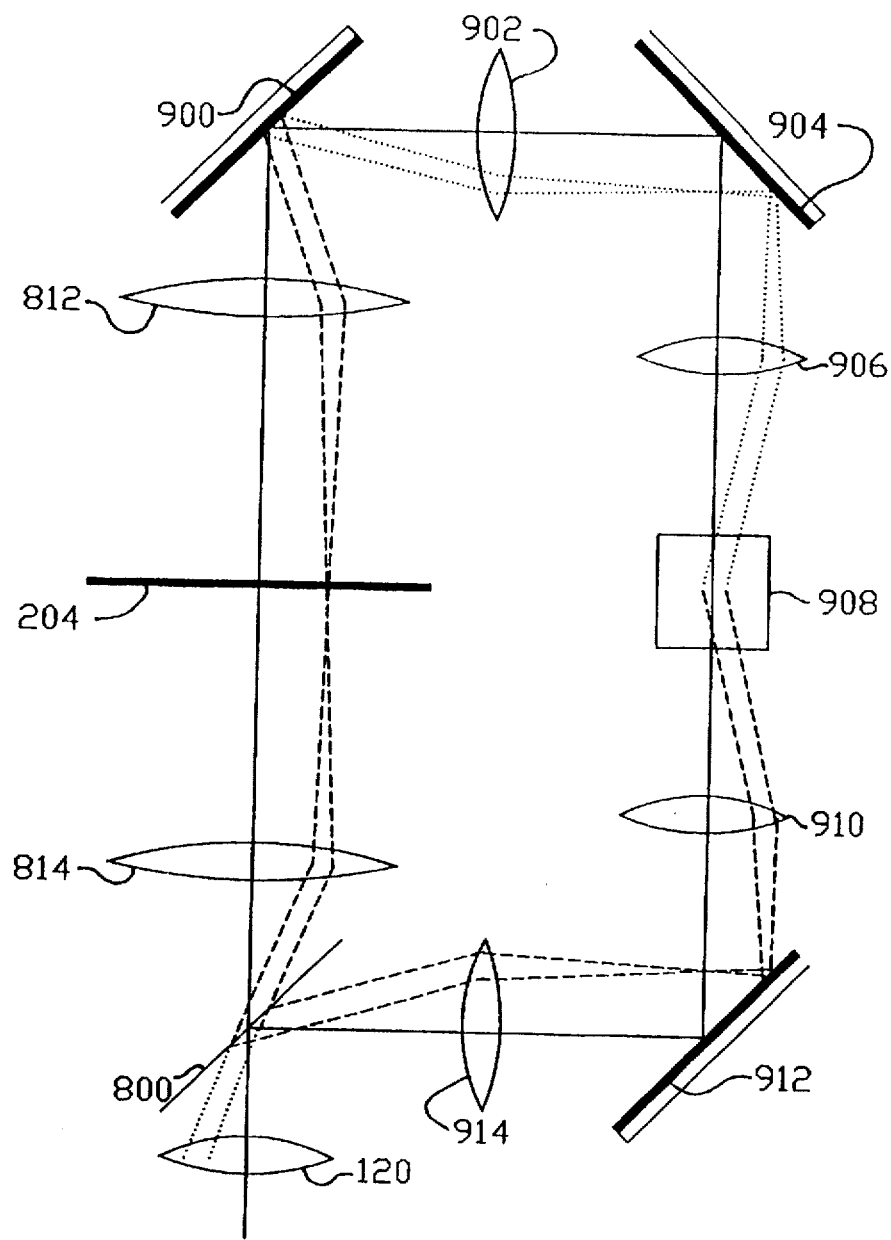
FIG. 9: A seventh embodiment of the present invention: The optical arrangement used in this embodiment uses lenses of smaller diameter to steer the scanning beams around the two laser scan lenses than were used in the sixth embodiment. Laser, spatial filter and beam expander, detection arm and scan system are not shown.

A seventh embodiment of the present invention is shown in FIG. 9. In this embodiment, the roof prism 810 of FIG. 8 has been replaced by mirror 900 and Reversion Prism 908, and lenses 804 and 806 have been replaced by four lenses 902, 906, 910 and 914, each of focal length f3, which is considerably shorter than f2. These four lenses are placed a distance 2f3 apart, measured along the optic axis, while taking into account the path length in glass in the Reversion Prism. Lenses 914 and 902 are placed a distance f3 from the entrance pupils of telecentric laser scan lenses 814 and 812 respectively. Because f3 is less than f2, these four lenses can have a much smaller diameter than was required for lenses 804 and 806, while still providing a large scan angle for the imaging system. As a practical consideration, these lenses have a diameter of 2 inches or less in the prototype version of the imaging system, and are readily available commercially.

Comments:

1) In embodiments where optical elements like half-wave plates, quarter-wave plates, polarizers, analyzers etc. must be inserted and removed during operation of the imaging system, it may be appropriate to replace these with glass plates such that the focus position of lenses is unchanged when these optical elements are inserted or removed.

2) Other light sources, including white light sources, may be used.

3) Other scan systems, including rotating polygons, acousto-optic deflectors, etc. may be used.

4) Designs that are not infinity-corrected are also possible.

Having described preferred embodiments of the new scanning laser imaging or mapping system for macroscopic specimens, constructed in accordance with the present invention, it is believed that other modifications, variations, and changes will be suggested to those skilled in the art in view of the teachings set forth herein. It is therefore to be understood that all such variations, modifications and changes are believed to fall within the scope of the present invention as defined by the appended claims.

We claim:

1. A confocal scanning beam optical imaging system for macroscopic specimens comprising:

means for supporting a specimen to be observed and measured;

an illumination source producing a light beam directed along an optical path toward said specimen;

a scan lens for focusing the light beam to a diffraction-limited spot in a prescribed specimen plane, there being no image plane between said scan lens and said specimen plane;

means for scanning the light beam to move the diffraction-limited spot in a predetermined scan pattern on said specimen plane;

a first detection arm receiving light reflected, scattered or emitted from said diffraction-limited spot in said specimen plane comprising:

a pinhole and a focusing lens for obtaining a focal point for confocal detection of the light returning from said specimen;

a first detector placed behind said pinhole;

a first beamsplitter directing light returning from said specimen into said first detection arm; and means for producing a signal from said first detector.

2. An imaging system as claimed in claim 1 wherein said scan lens has a body that is longer in a direction of said beam than in a direction perpendicular to said beam.

3. An imaging system as claimed in claim 2 wherein said scan lens is a telecentric scan lens.

4. An imaging system as claimed in claim 3 wherein the detector is a spectrally-resolved detector.

5. An imaging system as claimed in claim 3 further including:

a second detection arm and a second beamsplitter directing light returning from said specimen into said second detection arm;

said second beamsplitter being located between a first beamsplitter and said specimen;

said second detection arm comprising a condenser lens for collecting the light returning from said specimen and a second detector placed behind said condenser lens whereby a non-confocal image of the specimen is obtained.

6. An imaging system as claimed in claim 3 further including a condenser lens and a transmission detector placed on the opposite side of said specimen, said condenser lens and said transmission detector being coaxial with said scan lens, whereby light transmitted through said specimen is detected.

7. An imaging system as claimed in any one of claims 1, 2 or 3 wherein said illumination source is a laser.

8. An imaging system as claimed in claim 1 wherein said scan lens is a telecentric scan lens.

9. An imaging system as claimed in claim 8 wherein said scan lens is a laser scan lens.

10. A confocal scanning beam optical transmission and reflection imaging system for macroscopic specimens comprising means for supporting a specimen to be observed and measured, an illumination source producing a light beam directed along an optical path toward said specimen, an optical subassembly comprising a first telecentric scan lens for focusing the light beam to a diffraction-limited spot in a prescribed specimen plane, a second telecentric scan lens placed on the opposite side of said specimen, and coaxial with said first telecentric scan lens, at such a distance that the focal planes of the two telecentric scan lenses coincide, a beamsplitter to direct portions of said light beam toward each of the two telecentric scan lenses, a plurality of reflecting means and lenses, arranged such that the two telecentric scan lenses always focus their respective portions of the incoming light beam to the same spot on said prescribed specimen plane as the scan proceeds, means for scanning the light beam to move the diffraction-limited spot in a predetermined scan pattern on said specimen plane, a detection arm receiving light reflected, scattered or emitted from said diffraction-limited spot in said specimen plane comprising a pinhole and a focusing lens for obtaining a focal point for confocal detection of the light returning from said specimen, a detector placed behind said pinhole, a second beamsplitter directing light returning from said specimen into said detection arm, whereby the specimen is illuminated from both sides, and the detector receives both reflected and transmitted light resulting from each direction of illumination of said specimen.

11. The confocal scanning beam optical transmission and reflection imaging system for macroscopic specimens of claim 10 wherein said optical subassembly further includes a half-wave plate and a polarizer, and said detection further includes an analyzer in front of said focusing lens whereby the different imaging modes of the system can detect separately:

reflection from one side of the sample, reflection from the other side, transmission from one side, and transmission from the other side.

12. The confocal scanning beam optical transmission and reflection imaging system for macroscopic specimens of claim 10 wherein said beamsplitter in said optical subassembly is a polarizing beamsplitter, said optical subassembly further includes a first quarter-wave plate placed between said polarizing beamsplitter and said first telecentric laser scan lens, and a second quarter-wave plate placed between said polarizing beamsplitter and said second telecentric laser scan lens, a half-wave plate is placed between said polarizing beamsplitter and said means for scanning the light beam, whereby a transmission image illuminated from one side of said specimen is detected if said half-wave plate is removed, a transmission image illuminated from the other side of the specimen is detected if said half-wave plate is replaced, a reflection image from one side of the specimen is detected if both quarter-wave plates are removed, and a reflection image of the other side of the specimen is detected if said half-wave plate is also removed.

13. An imaging system as claimed in any one of claims 10, 11 or 12 wherein said illumination source is a laser.

14. A method of constructing a confocal scanning beam optical imaging system for macroscopic specimens, said system having means for supporting a specimen to be observed and measured, an illumination source producing a light beam directed along an optical path toward said specimen, means for scanning the light beam, a detection arm receiving light reflected, scattered or emitted from said specimen, said detection arm comprising a pinhole and a focusing lens for obtaining a focal point for confocal detection of the light returning from said specimen, a detector placed behind said pinhole, a beamsplitter directing light returning from said specimen into said detection arm with means for producing a signal from said detector, said method comprising the steps of inserting a scan lens for focusing the light beam to a diffraction-limited spot in a prescribed specimen plane without forming an image plane between said scan lens and said specimen planes; and scanning the light beam using the means for scanning to move the diffraction-limited spot in a predetermined scan pattern on said specimen plane.

15. A method as claimed in claim 14 including the steps of scanning said specimen over a scan angle of +/−8.5°.

16. A method of constructing a confocal scanning beam optical imaging system for macroscopic specimens, said system having means for supporting a specimen to be observed and measured, an illumination source producing a light beam directed along an optical path toward said specimen, means for scanning the light beam, a detection arm receiving light reflected, scattered or emitted from said specimen, said detection arm comprising a pinhole and a focusing lens for obtaining a focal point for confocal detection of the light returning from said specimen, a detector placed behind said pinhole, a beamsplitter directing light returning from said specimen into said detection arm with means for producing a signal from said detector, said method comprising the steps of inserting a telecentric scan lens for focusing the light beam to a diffraction-limited spot in a prescribed specimen plane without forming an image plane between said telecentric scan lens and said specimen plane; and scanning the light beam using the means for scanning to move the diffraction-limited spot in a predetermined scan pattern on said specimen plane, said beam having a center axis that is perpendicular to said specimen plane.

17. A method as claimed in claim 10 including the step of scanning said specimen with said beam over a distance of up to approximately 7.5 cm.

* * * * *